March 2, 1948.  C. S. BELL  2,436,988
TOWED AIRCRAFT AND MEANS FOR TOWING THE SAME
Filed Dec. 20, 1944  3 Sheets-Sheet 1
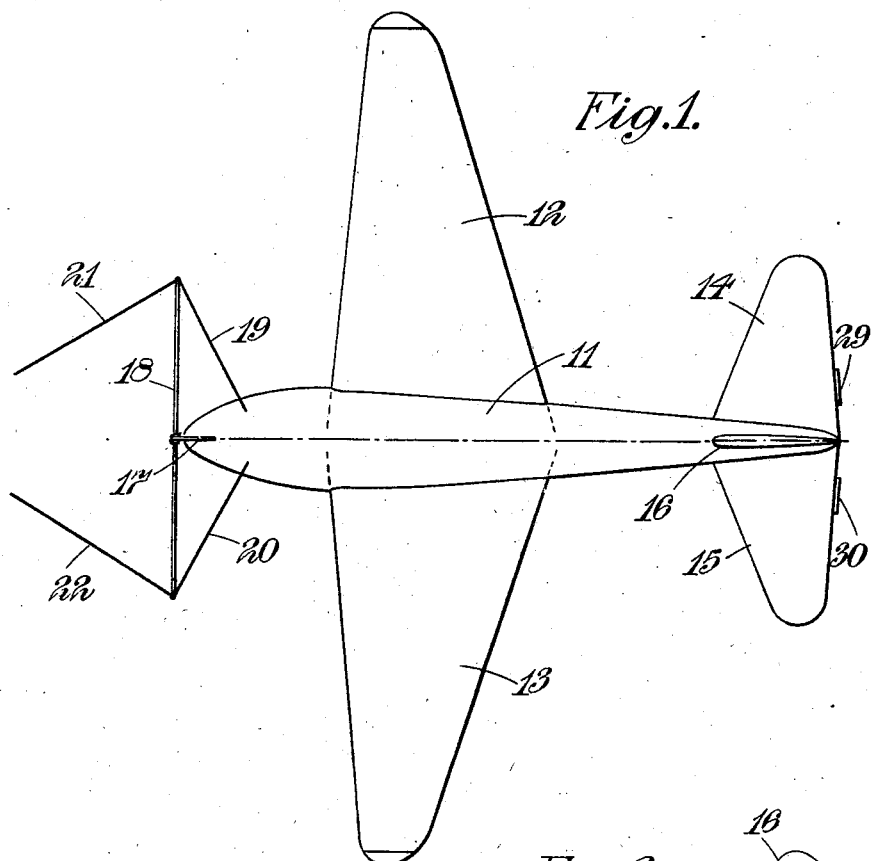
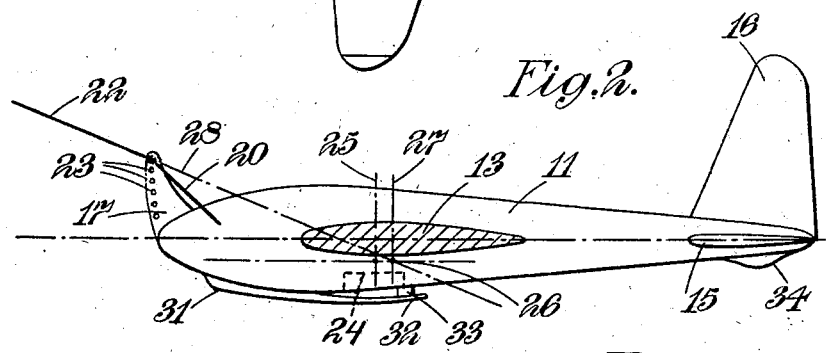
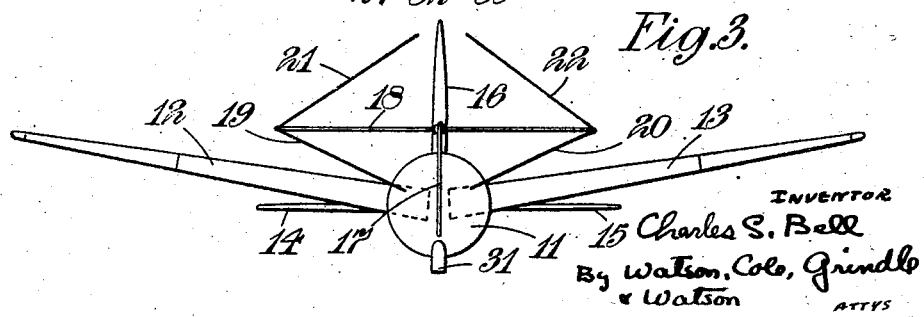
INVENTOR
Charles S. Bell
By Watson, Cole, Grindle
& Watson
ATTYS March 2, 1948. C. S. BELL 2,436,988
TOWED AIRCRAFT AND MEANS FOR TOWING THE SAME
Filed Dec. 20, 1944 3 Sheets-Sheet 2
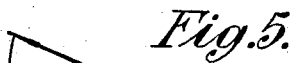
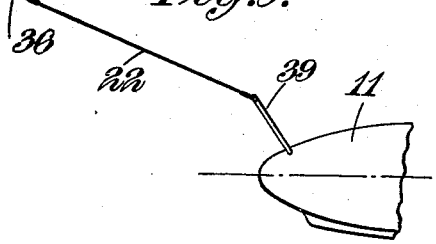
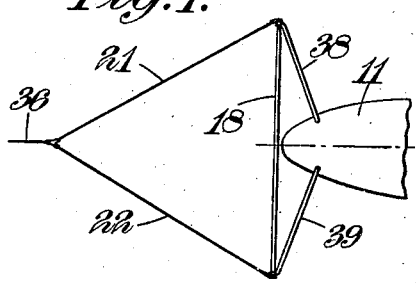
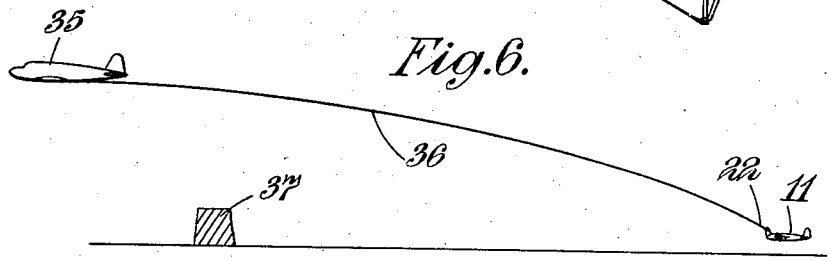
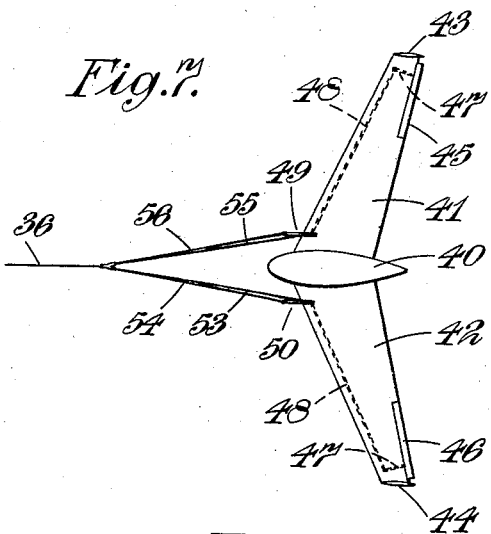
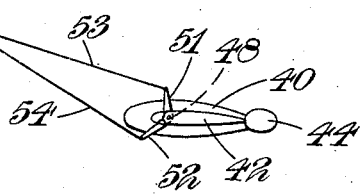
INVENTOR
Charles S. Bell
By Watson, Cole, Grindle &
Watson ATTYS March 2, 1948.　　　　C. S. BELL　　　　2,436,988
TOWED AIRCRAFT AND MEANS FOR TOWING THE SAME
Filed Dec. 20, 1944　　　3 Sheets-Sheet 3
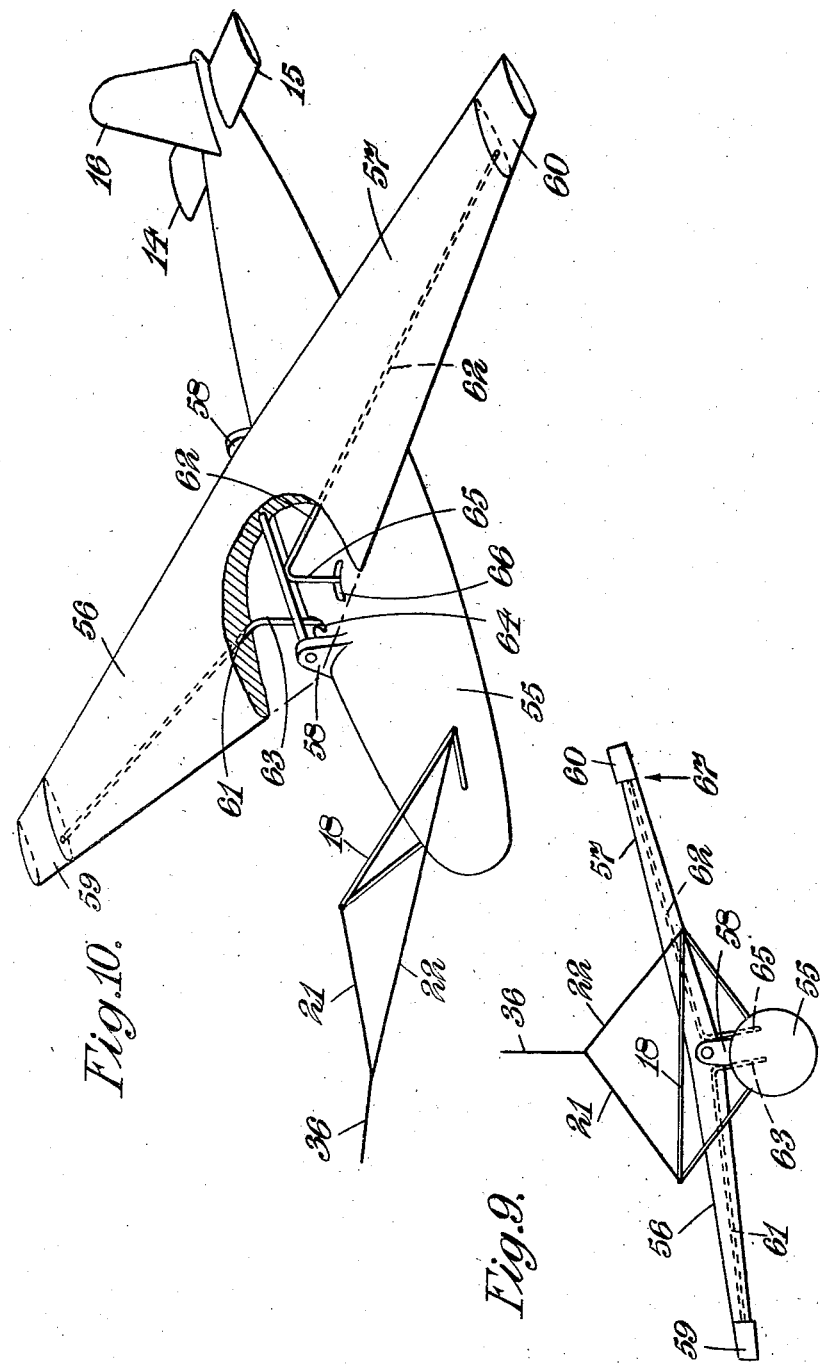

Patented Mar. 2, 1948

2,436,988

UNITED STATES PATENT OFFICE 2,436,988

TOWED AIRCRAFT AND MEANS FOR TOWING THE SAME

Charles Stanley Bell, Oakley, near Aylesbury, England

Application December 20, 1944, Serial No. 569,030
In Great Britain April 20, 1943

Section 1, Public Law 690, August 8, 1946
Patent expires April 20, 1963

6 Claims. (Cl. 244—3)

This invention relates to towed aircraft and means for towing the same, and has for one of its objects to provide a pilotless glider, without gyroscopic control, which will be stable in flight.

It is important that such an aircraft should have both lateral and longitudinal stability. In cases where the wing loading can be reduced to a figure far below that possible on an aeroplane which requires to carry pay load lateral stability is realtively easily achieved. Longitudinal stability can be assisted by so designing the wings that little or no movement of the centre of pressure occurs during flight, and this can be effected, as is known, by making use of a symmetrical wing section. There is however a tendency for the towed aircraft, when normally designed, to rise, especially at the higher speeds, and in many cases to climb above the towing aircraft (which may be called "the tug") at the maximum speed. It is an object of the present invention to solve the problem of providing for stable flight of the towed aircraft while at the same time ensuring that it shall keep below the level of the tug at all speeds of flight.

To this end according to one feature of the invention an aircraft for towing purposes having wings designed so that the centre of pressure moves very little in flight, is characterised by the fact that two attachment points for a crow's-foot connection to a towing cable are provided in front of and above the leading edges of the wings and the elevator means is set at little or no tilt so as to afford only a very slight lift at the wings. Such an aircraft is particularly suitable for a high-speed low-drag target for anti-aircraft gun practice, although as hereinafter pointed out it can be utilised also as a bomb carrier. The effect of the arrangement is that the lift required for the glider has to be provided by an upward pull by the towing cable and such can only occur when the glider is below the level of the towing machine. The employment of the crow's-foot connection helps lateral stability and, provided the center of gravity is located somewhat behind the centre of pressure, the arrangement is stable longitudinally also.

The invention further comprises an aircraft for towing purposes having wings designed so that the centre of pressure moves very little in flight, characterised by the fact that lever means are provided at the front of the aircraft for attachment by crow's-foot connection to a towing cable, the lever means being capable of movement in accordance with the vertical angle made by the towing cable with the aircraft and means being provided for operatively connecting the lever means to elevator means on the aircraft. By this means it becomes possible to control the elevator means of a towed aircraft, whether it carries a pilot or not, and notwithstanding the fact that the weight of the aircraft may be varied, for example by detaching load therefrom.

Preferably the lever means comprises two levers one to the left and one to the right of the centre line of the machine, each pivoted about an axis extending transversely across the machine and having upwardly and downwardly projecting lever arms, each lever being connected to the towing cable by a crow's-foot connection. Such an aircraft may be of the tailless type with wing elevators and the lever on each wing may be connected to the elevator on that wing.

The following is a description by way of example of various specific constructions of towed aircraft in accordance with the invention, reference being made to the accompanying drawings, in which:

Figure 1 is a plan view of an aircraft;

Figure 2 is a side elevation of the same showing one of the wings in cross-section;

Figure 3 is a front elevation of the same;

Figure 4 is a detail, in plan, of a modified connection to the towing cable;

Figure 5 is a side elevation of Figure 4;

Figure 6 is a diagram showing a tug and a towed aircraft in action;

Figure 7 is a plan of a modified construction of aircraft with automatically operated elevators;

Figure 8 is a side elevation of the same;

Figure 9 is a front view of a further construction, and

Figure 10 is a perspective view of the same.

Referring to Figures 1 to 3, the aircraft comprises a fuselage 11, wings 12, 13, tail planes 14, 15 and a tail fin 16. The wings 12, 13 are of symmetrical section and set parallel to the centre-line of the fuselage 11. If the fuselage is flying horizontally, they therefore do not produce any lift. The tail planes 14, 15 are set at a very slight negative angle which is not visible in the drawing and therefore tend to put the nose of the machine very slightly upward and to produce a very slight lift in the planes 12, 13. The front end of the fuselage 11 carries an upstanding fin 17 which supports a cross bar 18 steadied by guywire connections 19, 20 to the fuselage. To the ends of the cross bar there are secured two cables 21, 22 which are united together some distance ahead of the machine and are attached to a towing cable. The connections 21, 22 thus form a crow's-foot connection to the towing cable. The height of the connection above the centre-line of the fuselage can be varied and the fin 17 is provided with a number of different fixing holes 23 for this purpose.

The centre of gravity of the machine can be varied by moving fore or aft a weight 24 carried in the fuselage. The centre of pressure of the wing 13 is located upon the line 25, Figure 2, at about one-third of the width of the wing 13 from the leading edge and the centre of gravity is located at 26 on the vertical line 27 a little behind the line 25 which passes through the centre of pressure. The weight 24 is adjusted to secure this.

It is important that in flight the line of pull of the towing cable should pass through the centre of gravity 26, as is indicated by the chain-line 28. This line of pull will be determined by the resultant of the force needed to draw the aircraft forward through the air at the speed of the tug plane and the force needed to sustain the weight of the towed aircraft, because, as already explained, the planes 13 have so little lift that practically the whole of the lifting effort must come from the vertical component of the force on the towing cable. The height of the cross bar and the position of the weight 24 are adjusted to secure these conditions at towing speed and it will be evident that the condition is stable both laterally and longitudinally. The lateral stability is secured in the main owing to the crow's-foot connection 21 which resists any tendency of either wing to dip. As to longitudinal stability the location of the towing cable in front of the wings permits the line of pull of the cable to pass through the centre of gravity of the machine and close to the centre of pressure. In the event of any increase of towing speed the pressure, being slightly in advance of the centre of gravity, will tend to put the nose of the machine up a little and thus to cause the line of pull of the towing cable to move to the rear of the centre of gravity which will tend to restore the balance. Similarly in the event of a reduction of speed the line of pull of the towing cable will become more steeply inclined and will tend to pull the nose up. As a result the machine flies at a steady level well below the level of the tug.

Two small tabs 29, 30 are secured to the rear edges of the tail planes 14, 15 and may be set before flight by bending as may be found necessary to adjust the trim of the towed aircraft. A wooden skid 31 is secured to the underside of the fuselage and has a free portion 32 extending rearwardly beneath the belly of the fuselage, this portion being long enough to be springy and being connected to the body of the fuselage by a rubber buffer or other spring 33. A tail skid 34 of flat springy metal is also provided.

This aircraft has been found to provide a stable and realistic target for anti-aircraft practice. It may also be adapted for other uses. It ceases to be stable if detached from the towing cable but is capable, owing to the lift provided by the towing cable, of carrying a substantial load if desired and one use to which it may be put is indicated in Figure 6 of the drawing which also shows the general character of the towing arrangements. In Figure 6 the tug is indicated at 35 connected by a towing cable 36 to the crow's-foot connection 22 and thus to the machine 11. It will be observed that the effect of wind resistance on the towing cable is to cause the cable to bow upwardly during flight and that a large part of the lift applied to the machine is due to this phenomenon. If an aircraft constructed as described is loaded with an explosive charge it may be towed against cliffs or fortifications such as are indicated at 37. At a given speed of the tug and length of cable the aircraft will always fly at a specific difference of height from the tug, which will be known to the pilot of the tug, and therefore the height at which the aircraft 11 will strike the object 37 can be precisely predicted and high accuracy bombing of vertical faces of targets becomes practicable. Marine targets such as naval vessels are also vulnerable to this form of attack. It is necessary to provide for the detachment of the towing cable 36 at the moment of impact so as to avoid shock to the tug and this can be arranged either by making a connection to the tug which will break under a force somewhat greater than the towing force or by means of a breakable connection at some other point in the cable. The length of the cable 36 may be any desired, as much as a mile or two miles, in which case the difference of height between the tug and the towed aircraft is very great. The absence of any substantial lift from the wings 12, 13, conduces to the reduction of the force required in a horizontal direction for its travel and therefore the aircraft reduces the speed of the tug, as compared with its speed when free, only very slightly.

As an alternative to the method of fixing the cross-bar 18 shown in Figures 1 to 3 the fuselage 11 may carry horns 38, 39 on which the cross-bar is secured as shown in Figures 4 and 5, or the horns may be secured to the front edges of the wings or any other fixing for the crow's-foot connection may be provided.

It will be appreciated that as the machine 11 already described affords very little lift at flying speed, immediately it is detached from the tow rope 36 it will dive and therefore although it will act as a stable target while being towed or can carry weight in circumstances parallel to those described in connection with Figure 6, it cannot be caused to be detached from the tug 35 and enabled to land smoothly. Moreover for carrying substantial loads it may be desirable that the wings of the machine should be so shaped as to afford a substantial lift in which case in order to secure stability while being towed further control is necessary; in both the conditions contemplated it is desirable that there should be automatically controlled elevator means on the towed aircraft and Figures 7 and 8 show a construction in which this is effected. The particular construction illustrated in Figures 7 and 8 is of a tailless glider but the principles employed could be adapted to a glider having a long fuselage and a tail, if desired.

In Figures 7 and 8 the glider comprises a body 40 to which are secured wings 41, 42. The wings are back-swept and preferably set at a slight dihedral angle although this cannot be seen from the figures. They are also given a greater incidence near the body 40 than near the wing tips and they carry at their outer ends vertical fins 43, 44 which help to guide the glider in a straight course behind the towing rope 36. This type of aeroplane, without a tail and with rearwardly-swept wings the incidence of which washes out towards the tips, is known per se and affords a type of plane which is capable of stable flight. Near the tip of each wing is an elevator or aileron, 45 on the wing 41 and 46 on the wing 42. Each aileron is hinged to its wing and provided with a downwardly depending lever located within the wing thickness, which lever is connected by a push rod 47 to a lever arm on a rock shaft 48. The rock shafts 48 are therefore able to work the elevators. Near the body of each rock shaft carries a lever 49 on the wing 41 and 50 on the wing 42. Each lever consists of two arms, an upwardly extending arm 51 (Figure 8) and a downwardly extending arm 52. The arms 51, 52 on the wing 42 are connected by a crow's-foot connection 53, 54 to an anchoring point on the towing cable 36 and the corresponding arms on the lever 49 of the other wing are connected by a crow's-foot connection 55, 56 to the same anchoring point on the towing cable. The effect is that if the nose of the glider tends to rise the rock shafts 48 are moved in such a direction that they turn the elevators 45, 46 downward and correct the tendency while if the nose tends to dip the elevators are lifted and the nose is put up again. Moreover in addition to the lateral stabilising effect of the crow's-foot connection to the right and left side of the machine already explained in connection with Figures 1 to 3, there is a further stabilising effect in that if one wing goes up and the other down the elevator on the up side is depressed and that on the down side is lifted.

Preferably the elevators 45, 46 are given a bias, for example by means of springs within the wing spaces, so that in the event of the towing cable 36 being cut or detached the elevators will move upwardly and put the nose of the machine upward thus affording sufficient additional lift to prevent it diving on detachment of the cable. In this way the load can be flown to a destination, the towing cable detached by the pilot in the tug and the glider will glide of itself to land while the tug flies on. It is even possible to have a train of such gliders behind the tug, each suspended by a towing cable from the one in front of it (and the foremost from the tug) and to arrange for these to be detached one after another beginning with the lowermost. Thus, for example, loads of postal mail for various destinations may be slipped one at a time when over their destination while the tug flies on with the remaining load to other destinations and an air mail delivery to a number of different centres, which may not provide landing fields adequate for an aircraft or may not be of sufficient importance to demand an aircraft to themselves, may readily be afforded by a number of relatively small gliders according to the present invention.

Figures 9 and 10 show another alternative construction intended to afford additional lateral stability in gusty weather or other difficult conditions. In this case the fuselage 55 is not rigidly connected to the wings 56, 57 but the wings are pivoted to brackets 58 on the upper side of the fuselage about an axis extending parallel to the centre line of the fuselage. As before there is a towing cable 36 connected by a crow's-foot 21, 22 to a cross-bar 18 secured to the fuselage and there are tail planes 14, 15 and a fin 16 at the back of the fuselage. Each of the wings carries at its tip a stabilising plane 59 or 60 and the stabilising plane is capable of rotation about the axis of a rock shaft extending along the interior of the wing. The rock shaft in the wing 56 is numbered 61 in the drawing and the rock shaft in the wing 57 is numbered 62. The rock shaft 61 carries a downwardly depending arm 63 which enters a cam slot 64 carried by the fuselage and the rock shaft 62 has a similar downwardly depending arm 65 entering a cam slot 66. In the event of an up gust, such as is indicated by the arrow 67, Figure 9, tending to tilt the wing 57 upwardly and the wing 56 downwardly the arms 63, 65 will move along the cam slots 64, 66 and will rotate the stabilising planes 59, 60 in opposite directions. In the case supposed the plane 60 will be turned upwardly at the back so as to tend to drive the wing 57 downwards as shown in Figure 9 and the plane 59 will be turned downwardly at the back so as to give additional lift to the wing on that side. The reverse action takes place if the wing on the other side of the machine is lifted.

Although this device for lateral stabilisation has been illustrated in connection with a plane having a simple crow's-foot connection to the towing cable such as is shown in Figures 1 to 3, it will be appreciated that it could also be applied on a glider such as is shown in Figures 7 and 8, in which the towing cable has operative connections to elevators for altering the trim in a fore and aft direction of the glider.

I claim:

1. An aircraft for towing comprising wings of substantially symmetrical surface about the planes in which the front and rear edges of the wings lie, elevator means set at such an angle of incidence as to trim the main planes to an angle of incidence where their lift is less than the weight of the glider and means in front of and above the leading edges of the wings for attachment of crow's-foot connections for a towing cable, the said means being located symmetrically on opposite sides of the vertical central plane of the machine.

2. An aircraft for towing comprising wings of substantially symmetrical surface about the planes in which the front and rear edges of the wings lie, elevator means set at such an angle of incidence as to trim the main planes to an angle of incidence where their lift is less than the weight of the glider, levers on each wing symmetrically located relatively to the centre line of the machine and extending in an up and down direction, means connecting the levers with the elevator means and four crow's-foot connections, two from the ends of each lever to a towing cable.

3. An aircraft for towing comprising wings of substantially symmetrical surface about the planes in which the front and rear edges of the wings lie, elevator means set at such an angle of incidence as to trim the main planes to an angle of incidence where their lift is less than the weight of the glider, an upstanding attachment in front of and above the leading edges of the wings extending on both sides of the vertical central plane of the machine to points of attachment for crow's-foot connections from a towing cable, the points of attachment being such that the line of pull of the cable passes through the centre of gravity of the machine, the weight of the parts being so distributed that the centre of gravity lies slightly behind the centre of pressure on the wings.

4. An aircraft as claimed in claim 1, wherein the means for attachment of crowsfoot connections is coupled to said connections and thereby to a towing cable and wherein the towing cable is provided with means for ready detachment from the towing means.

5. An aircraft for towing purposes of the tailless type, the wings being of substantially symmetrical surface about planes passing through the front and rear edges of the wings, wing elevators thereon, lever means on each wing symmetrically disposed on opposite sides of the vertical central plane of the machine, said lever means projecting upwardly and downwardly from the wing, connections from said lever means to the wing elevators and crow's-foot connections from the ends of each lever to a single towing cable.

6. An aircraft for towing comprising a fuselage, wings thereon each of which is of symmetrical surface above and below a plane in which the front and rear edges of the wing lie, fixed tail elevators and fin on the fuselage the tail elevators being set at such an angle of incidence as to trim the main planes to an angle of incidence where their lift is less than the weight of the glider and a towing attachment on the front of the fuselage comprising an upstanding member with transverse extensions to afford two symmetrical towing points above and in front of the leading edges of the wings.

CHARLES STANLEY BELL.

REFERENCES CITED

The following references are of record in the file of this patent:

UNITED STATES PATENTS

| Number | Name | Date |
|---|---|---|
| 1,185,536 | Rabick | May 30, 1916 |
| 1,218,586 | Steinmets | Mar. 6, 1917 |
| 1,729,354 | Mounce | Sept. 24, 1929 |
| 1,802,283 | Simmonds | Mar. 2, 1931 |
| 1,935,672 | Settle | Nov. 21, 1933 |

FOREIGN PATENTS

| Number | Country | Date |
|---|---|---|
| 112,673 | Great Britain | June 22, 1918 |
| 552,749 | Great Britain | Apr. 22, 1943 |
| 798,180 | France | Mar. 2, 1936 |